Patented Jan. 13, 1942

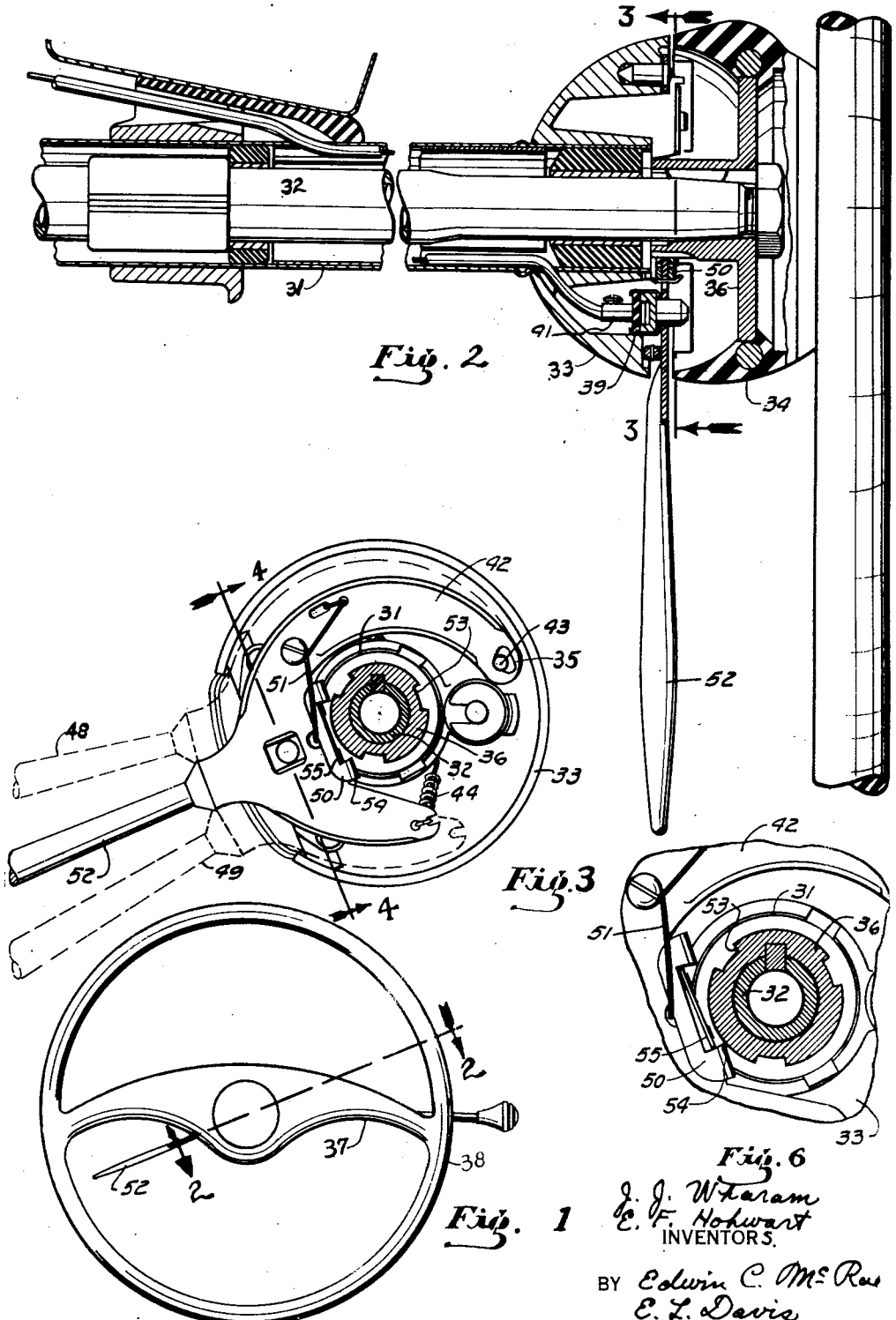

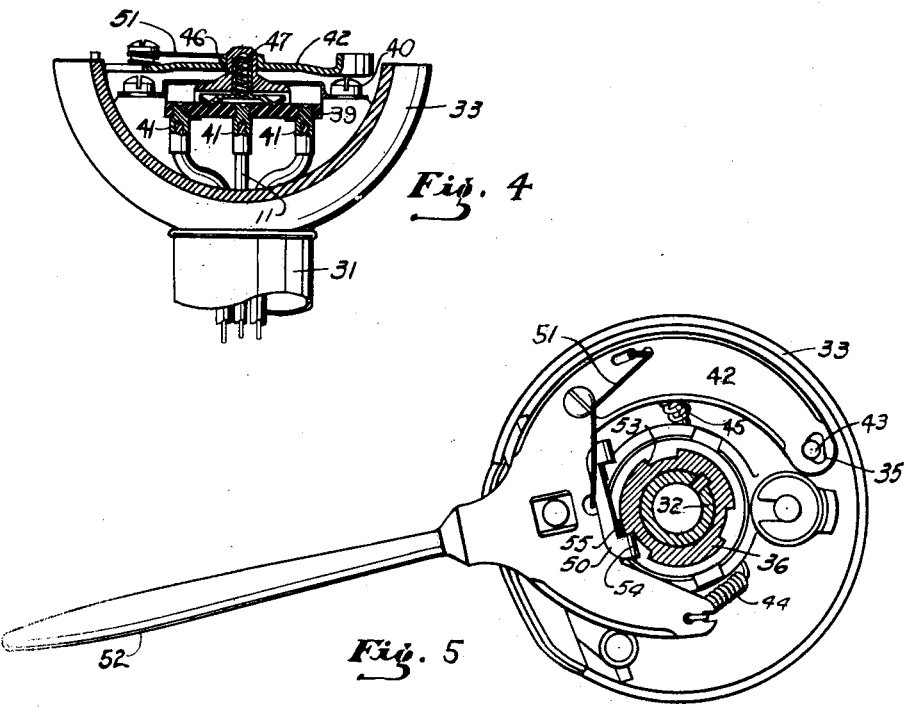
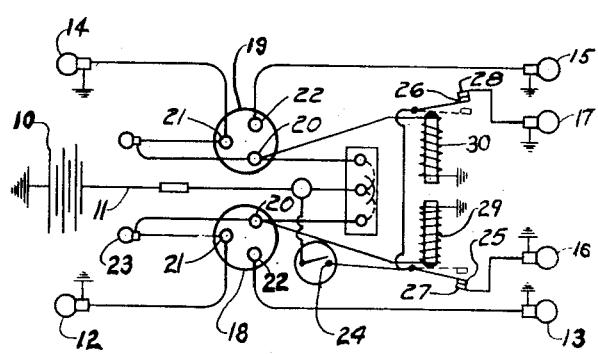

2,269,499

UNITED STATES PATENT OFFICE 2,269,499

MOTOR VEHICLE TURN INDICATOR SWITCH

John J. Wharam, Dearborn, and Ernest F. Hohwart, Detroit, Mich., assignors to Ford Motor Company, Dearborn, Mich., a corporation of Delaware Application June 24, 1940, Serial No. 342,006

5 Claims. (Cl. 200—59)

The object of our invention is to provide a motor vehicle turn indicator switch of simple, durable and inexpensive construction.

A further object of our invention is to provide a motor vehicle turn indicator switch which is especially adapted for mounting upon the steering column of the vehicle just beneath the steering wheel so as to be conveniently operated by the driver of the vehicle.

Our improved switch is designed to flash signal lights at the front and rear of the car on the particular side that the turn is to be made. An important feature of this construction is that rotation of the steering wheel in the direction in which the turn is to be made will not in any way actuate the switch, while the return movement of the steering wheel to a straight ahead direction will move the switch from its operative position to the neutral or off position.

Still a further object of our invention is to provide a turn indicator switch which will be positively moved to an off position by the return movement of the steering wheel and which will have means associated therewith so that during the interval that the steering wheel is returning the switch to its neutral position the operator may overrule this return force by simply moving the switch operating lever.

With these and other objects in view, our invention consists in the arrangement, construction and combination of the various parts of our improved device, as described in this specification, claimed in our claims, and illustrated in the accompanying drawings, in which:

Figure 1 is a plan view of a motor vehicle steering wheel having our improved switch construction installed thereon.

Figure 2 is a sectional view, taken upon the line 2—2 of Figure 1.

Figure 3 is a sectional view, taken upon the line 3—3 of Figure 2.

Figure 4 is a sectional view, taken upon the line 4—4 of Figure 3.

Figure 5 is a view, similar to that shown in Figure 3, wherein the switch mechanism is shown in the right turn position and the steering wheel in position to automatically turn the switch off.

Figure 6 is an enlarged view of the switch operating dog and,

Figure 7 is a schematic wiring diagram of the signal system incorporating our improved switch.

Before describing in detail our switch mechanism, it may be well to describe the wiring diagram, as shown in Figure 7, so as to make the function of the switch more clear. Referring to Figure 7, we have used the reference numeral 10 to indicate a motor vehicle battery, one terminal of which is grounded and the other terminal of which is connected by means of a wire 11 to the center terminal of our improved switch construction. A pair of indicator lights 12 and 13 are provided on the front and rear fenders, respectively, on the left-hand side of the car, while a second pair of lights 14 and 15 are mounted upon the front and rear fenders, respectively, at the right-hand side of the car. Separate stop lights 16 and 17 are also mounted at the rear corners of the car. The bulbs 13 and 16 may be mounted in the same lamp housing, as may the bulbs 15 and 17. If desired, separate housings may be provided for each of these bulbs.

A pair of thermostatically operated flashing relays 18 and 19 are mounted in the vehicle, each of these relays being arranged to alternately flash the front and rear lights on one side of the car when the particular relay is energized. Each relay is essentially a two-way switch in which a common terminal 20 is normally connected with a terminal 21. The bulb 12 is connected to terminal 21. Thermostatically operated means are provided for opening the circuit with terminal 21 and closing the circuit with a terminal 22. The rear bulb 13 is connected to the terminal 22. Current is supplied to terminal 20 through our improved switch from the wire 11. The cycle of operation is about one second duration to cause flashing of both bulbs. A pilot light 23 is mounted on the instrument board of the vehicle and is connected with terminal 21 to indicate when either flashing signal is in operation.

It will be noted that the terminals 20 of these flashing relays are connected with two terminals on our improved switch, so that when the switch is moved from neutral to one position, one of the relays is energized to thereby alternately flash the front and rear bulbs connected thereto, and when it is moved to its other position, then the other relay is energized to flash the bulbs at the other side of the car.

We have provided a stop light switch 24 which is connected to the braking system of the vehicle in the conventional manner. One terminal of this switch is connected to the hot wire 11, while the other terminal is connected to a pair of movable relay points 25 and 26, respectively. These points 25 and 26 are adapted to normally make connection with stationary points 27 and 28, respectively. Points 27 and 28 are connected with lamps 16 and 17, respectively. When the stop light switch 24 is closed, under normal conditions, the points 25 and 27 are in contact with each other and points 26 and 28 are likewise in contact with each other so that both of the lamps 16 and 17 are constantly energized. This produces the ordinary stop light warning signal. A conventional relay winding 29, when energized, draws the contact point 25 away from the point 27 to open the circuit of the lamp 16. The winding 29 is connected to the left-hand flasher terminal 20. A second relay winding 30 actuates the point 26 and is connected to the other flasher. When either of these windings is energized, the associated stop light circuit is opened. Thus, the stop light on one particular side of the car cannot be operated while its turn indicating light is burning. However, the other stop light will burn continuously as long as the stop light switch is closed. In this way the flashing light 13 on the left side of the car is not blanketed out by the continuously burning stop light 16. The light 17 on the opposite side of the car at this time burns continuously to indicate that a stop is being made.

Referring to Figure 2 of the drawings, we have used the reference numeral 31 to indicate the steering column of a motor vehicle in which a steering shaft 32 is rotatably mounted. A semispherical housing 33 is fixed to the upper end of the steering column 31 and a semispherical steering wheel hub 34 is fixed to the shaft 32. The members 33 and 34 form a spherical chamber in which our switch is mounted. The hub 34 is molded of plastic around a steel hub insert 36 which is keyed to the shaft 32 in the conventional manner. A pair of arms 37 extends from opposite sides of the hub portion 34 and terminates in a rim 38 to form the steering wheel.

It will be noted from Figure 2 that both the spherical housing 33 and the hub 34 are more or less shells so that when they are in their positions, a considerable space is provided within these spherical members. Our improved switch construction is adapted to be mounted within this space.

Our switch is shown in Figure 4, from which it will be seen that a stationary plate of insulating material 39 is fixed in position within the housing member 33 by means of screws 40. Three terminals 41 are arranged in a row in the plate 39, the center terminal of which is connected to the hot wire 11 and the two end terminals of which are connected to the terminals 20 of the respective relays 18 and 19. When the switch is in a neutral position, all three of these terminals are disconnected from each other. In one operative position the center terminal is connected with one of the end terminals and in the other operative position the center terminal is connected with the other end terminal.

The switch proper comprises a U-shaped arm member 42, one arm of which is mounted on a knife edged pivot 43 with the other arm extending around the steering wheel shaft. Tension springs 44 and 45 extend between the ends of the U-shaped member 42 and the housing 33. Both of these springs extend downwardly toward the bottom of the member 33 where they are anchored so as to pull the U-shaped member downwardly and toward the right, as viewed in Figure 5. The arm 42 is provided with a triangular shaped opening 35, through which the pivot pin 43 extends so that considerable lateral movement is permitted between the arm and this pivot. The springs 44 and 45 urge the arm 42 to pivot around the center corner of this triangular shaped aperture. However, this arm may be moved to the left in Figure 5 is a force sufficient to overcome the pressure exerted by these springs is provided.

Referring to Figure 4, we have provided a slide member 46 which is mounted for vertical reciprocation in the arm 42 in position directly above the plate 39. A spring 47 urges the slide member 46 into contact with the plate 39. When the arm is in its neutral position, as shown in Figure 3, the slide member 46 does not contact any of the terminals 41. However, when the switch is in the right turn position, as shown by dotted lines 48 in Figure 3, then the member 46 connects the center terminal with the left-hand terminal of the switch. The left turn position is shown by dotted lines 49 in Figure 3, in which position the member 46 connects the center switch terminal with the right-hand terminal 41. In order to so move the switch, we have provided a lever 52 which extends from the arm 42 to a position just beneath the rim of the steering wheel to thereby be accessible to the operator. Movement of the lever causes the arm 42 to swing around the pivot 43, to thereby move the slide member 46 in a substantially straight path along the plate 39.

From the foregoing, it will be seen that when the switch is moved to the position shown by dotted lines 48, the right-hand flasher 19 will be energized to thereby flash the lights 14 and 15 and that when the switch is in the position shown by dotted lines 49, the left-hand flasher 18 and lights 12 and 13 are energized.

We have provided means actuated by the steering wheel for automatically moving the switch back to its neutral position by the return movement of the steering wheel after it has been manually moved to either its right- or left-hand positions. This means comprises a dog member 50 which is loosely mounted upon the inside of the U-shaped arm 42 adjacent to the slide member 46. The dog 50 is of channel shape with the side arms extending over the top and bottom faces of the arm 42. The center part of the channel web is removed so that ears 54 remain at each end of this dog. In practice the dog 50 is formed as a square sheet metal stamping with a square opening therethrough and is then bent to U-shaped section, as shown.

After the dog 50 is assembled on the arm 42, a plate 55 is riveted to the adjacent portion of the arm within the center relieved portion of the dog. This plate thus prevents lengthwise movement of the dog and also limits the movement of the dog toward the hub insert 36. The dog may, however, move a considerable distance away from this hub. A torsion spring 51 is provided, one end of which is anchored in the arm 42 and the other end of which bears against the dog 50 to urge it toward the steering wheel shaft.

When, in the normal operation of the device, the operator desires to make a right turn, the lever 52 is moved upwardly to position shown by dotted lines 48 so as to energize the relay 19 and thus alternately flash the lights 14 and 15. The friction between the slide member 46 and the plate 39 is sufficient to retain the switch mechanism in either of its operative positions.

To automatically return the switch to a neutral position, we have provided three notches 53 which are machined axially along the periphery of the hub insert 36. When the steering wheel is in a straight ahead position, the notches are located in relation to the dog 50 as shown in Figure 3. This is the normal driving position for straight ahead movement of the car. At this time the switch may readily be moved without interference with the notches because the ears 54 slide around the periphery of the hub, as shown in Figure 6, the dog 50 moving inwardly from the insert 36 against the resistance of the spring 51.

From the foregoing, it will be noted that when the switch is in the right turn position, movement of the steering wheel in a clockwise direction will have no tendency to actuate the switch. However, return movement of the wheel in a counterclockwise direction, as occurs after the turn has been made, causes the notch nearest to the lower ear 54 to engage this ear, thereby swinging the dog along with the hub of the wheel in a counterclockwise direction to its neutral position. In like manner, when the switch is moved to the left turn position, movement of the steering wheel in a counterclockwise direction has no effect upon the position of the switch but return clockwise movement of the wheel to a straight ahead position causes one of the notches to engage the upper ear 54 to move the switch therewith to a neutral position.

Three notches 53 are provided in the hub 36 so that the switch may be returned by only a relatively small movement of the steering wheel. This sometimes happens when the vehicle is being straightened out after rounding a very gradual curve. In actual practice, however, it may be necessary to provide one notch in the hub insert.

It sometimes happens that the operator desires to retain the switch in one of its engaged positions after a return motion of the steering wheel. This may happen where the vehicle emerges into a curve of greater radius from a relatively sharp curve. We have provided means, as will now be described, for accomplishing this. When the automatic return is being made, one ear 54 is locked in one of the notches 53 so that if a simple pivot were provided at 43, then the operator would be unable to retain the switch in its engaged position and still return the steering wheel. The provision of the triangular shaped bearing at 43 eliminates this defect. If, when the switch is in the position shown in Figure 5, it is decided to hold the switch against a counterclockwise motion of the steering wheel, then the lever 52 is held stationary so that movement of the wheel pivots the arm 42 around the point of contact between the ear 54 and the notch 53. This movement swings the pivoted end of the arm 42 downwardly to cause it to ride upon the triangular shaped opening 35, thereby pushing the arm 42 bodily to the left against the resistance of the springs 44 and 45. This forces the ear 54 out of the notch 53 to thus disconnect the dog and hub and permit the switch to stay in the right turn position. By this means a positive automatic return movement for the switch is assured because the angle between the ears 54 and the notches 53 is such that movement of the notch will positively return the switch to neutral. It is only by rocking the switch arm that the returning force may be overruled.

Among the many advantages resulting from the use of our improved construction, it may be well to mention that the switch is relatively inexpensive to manufacture, that it is responsive at all times to the will of the operator, that it is automatically returnable from either position by a return movement of the steering wheel and that it is of such shape that it can be readily mounted within the hub portion of the steering column and still be of sufficient size that the parts form a rugged construction.

Some changes may be made in the arrangement, construction and combination of the various parts of our improved construction without departing from the spirit of our invention, and it is our intention to cover by our claims, such changes as may reasonably be included within the scope thereof.

We claim as our invention:

1. A turn indicator switch adapted to be mounted adjacent to the steering wheel of a motor vehicle and to be manually moved in either direction from a neutral position to an indicating position and to be normally returned from either of said indicating positions by the return movement of said steering wheel to a straight ahead direction comprising, an arm pivotally mounted beneath said steering wheel, an operable switch disposed adjacent to said arm, one member of said switch being stationary and the other connected to said arm so that when said arm is moved in either direction from a neutral position said switch will be operated, a switch operating member fixed to said steering wheel, a shoe mounted upon said arm in alignment with said operating member, a spring resiliently urging said shoe toward said operating member so that movement of said arm to each of its operative positions will cause said shoe to engage said operating member, said shoe being so shaped that return movement of said steering wheel to a straight ahead direction will move said engaged shoe and associated arm back to said neutral position, and means operable between said arm and said stationary portion, whereby the tendency to return may be overruled and said switch maintained in an indicating position.

2. A turn indicator switch adapted to be mounted adjacent to the steering wheel of a motor vehicle and to be manually moved in either direction from a neutral position to an indicating position and to be normally returned from either of said indicating positions by the return movement of said steering wheel to a straight ahead direction comprising, an arm pivotally mounted beneath said steering wheel at a point spaced radially from the axis of said wheel, a stationary switch plate secured adjacent to said arm, switch terminals in said plate, a switch contact member mounted upon said arm in position to selectively engage said terminals, a switch operating member fixed to said steering wheel having a notch therein, a double ended shoe pivotally mounted upon said arm in alignment with said switch operating member, and a spring resiliently urging said shoe toward said operating member so that movement of said arm to each of its operative positions will cause the respective ends of said shoe to engage said operating member, the ends of said shoe being so shaped that said return movement of the steering wheel from either of its turned positions will rotate said member and move said engaged shoe and associated arm to said neutral position, and means operable about said pivot point whereby said shoe may be disengaged from said operating member when it is desired to maintain said switch in its indicating position through the return movement of said steering wheel.

3. A turn indicator switch adapted to be mounted adjacent to the steering wheel of a motor vehicle and to be manually moved in each direction from a neutral position to an indicating position and to be returned from either of said indicating positions by the return movement of said steering wheel to a straight ahead direction comprising, an arm pivotally mounted beneath said steering wheel at a point spaced radially from the axis of said wheel, a stationary switch plate secured adjacent to said arm, switch terminals in said plate, a switch contact member mounted upon said arm in position to selectively engage said terminals, a switch operating ring fixed to said steering wheel, said ring having a notch therein, a double ended shoe reciprocally mounted upon said arm for movement toward and from said ring, a spring resiliently urging said shoe toward said ring so that movement of said arm to either of its operative positions will cause the respective ends of said shoe to engage said ring member, the ends of said shoe being so shaped that return movement of said steering wheel from each of its turned positions will rotate said ring and move said engaged shoe and associated arms to said neutral position, said arm member adjacent to said pivotal connection having a pair of annular disposed cam surfaces formed thereon, resilient means for urging said arm to a position where said pivot is disposed between said cam surfaces, so that when one end of said shoe is engaged in said notch, rotation of said arm around said notch will move said arm and shoe upon said cam surfaces, for the purpose described.

4. A turn-indicator switch adapted to be mounted adjacent to the steering wheel of a motor vehicle and to be manually moved in either direction from a neutral position to an indicating position and to be normally returned from either of said indicating positions by return movement of said steering wheel to a straight-ahead direction, comprising, an operating arm mounted beneath said steering wheel, switch means carried by said arm, cooperating switch means fixedly mounted in relation thereto, so that when said operating arm is moved in either direction from the neutral position said switch will be operated, a switch operating member fixed to the steering mechanism, connected to said steering wheel, notches upon said switch operating member engaging said operating arm, said engagement being such that return movement of said steering wheel to straight-ahead direction will move said operating arm to neutral position, and means to overrule said engagement whereby said operating arm and switch may be maintained in an indicating position through the return of said steering wheel to a straight-ahead direction.

5. A turn-indicator switch adapted to be mounted adjacent to the steering wheel of a motor vehicle and to be manually moved in either direction from a neutral position to an indicating position and to be normally returned from either of said indicating positions by the return movement of said steering wheel to a straight-ahead direction, comprising, an arm pivotally mounted beneath said steering wheel, switch means carried by said arm, stationary switch means cooperating therewith, so that when said arm is moved in either direction from a neutral position said switch will be operated, a switch operating member fixed to the steering mechanism, engaging means mounted upon said arm cooperating with said switch operating member, said engagement being such that return movement of said steering wheel to straight-ahead direction will normally return said operating arm to neutral position and means associated with said operating arm whereby said switch operating member and said cooperating means may be selectively disengaged when it is desired to maintain the switch in an indicating position through the return of said steering wheel to a straight-ahead direction.

JOHN J. WHARAM.
E. F. HOHWART.